(12) United States Patent
Gordon et al.

(10) Patent No.: US 10,777,781 B2
(45) Date of Patent: Sep. 15, 2020

(54) MONOBLOCS AND MONOBLOC BATTERIES

(71) Applicant: ZAF ENERGY SYSTEMS, INCORPORATED, Bozeman, MT (US)

(72) Inventors: Michael J. Gordon, Joplin, MO (US); Shiloh J. Williams, Joplin, MO (US); Michael T. Shireman, Riverton, KS (US); Eivind Listerud, Osceola, MO (US); Adam Weisenstein, Bozeman, MT (US); Randy Moore, Joplin, MO (US)

(73) Assignee: ZAF ENERGY SYSTEMS, INCORPORATED, Bozeman, MT (US)

( * ) Notice: Subject to any disclaimer, the term of this patent is extended or adjusted under 35 U.S.C. 154(b) by 0 days.

(21) Appl. No.: 16/591,416

(22) Filed: Oct. 2, 2019

(65) Prior Publication Data

US 2020/0259131 A1 Aug. 13, 2020

Related U.S. Application Data

(63) Continuation of application No. 16/273,755, filed on Feb. 12, 2019.

(51) Int. Cl.
*H01M 2/02* (2006.01)
*H01M 2/20* (2006.01)
*H01M 2/10* (2006.01)
*H01M 2/04* (2006.01)

(52) U.S. Cl.
CPC ......... *H01M 2/0242* (2013.01); *H01M 2/043* (2013.01); *H01M 2/1077* (2013.01); *H01M 2/206* (2013.01)

(58) Field of Classification Search
CPC .. H01M 2/0242; H01M 2/043; H01M 2/1077; H01M 2/206
See application file for complete search history.

(56) References Cited

U.S. PATENT DOCUMENTS

2009/0169978 A1 7/2009 Smith et al.
2013/0037336 A1* 2/2013 Ojeda ............... B60K 1/04
                                               180/68.5

(Continued)

FOREIGN PATENT DOCUMENTS

| EP | 1479127 A2 | 11/2004 |
| EP | 1775784 A1 | 4/2007 |
| EP | 3480867 A1 | 5/2019 |

OTHER PUBLICATIONS

International Search Report and Written Opinion of the International Searching Authority for International Application No. PCT/US2020/017814 dated May 21, 2020, 6 pgs.

*Primary Examiner* — James Lee
(74) *Attorney, Agent, or Firm* — Brooks Kushman P.C.

(57) ABSTRACT

Monobloc batteries include compartments containing cells. Terminals extend into the compartments and are electrically connected with the cells via tabs. The tabs are folded to form bent stacks and include openings in partial registration with each other. The terminals extend through the openings and are secured to the tabs. The terminals are off-center relative to the compartments to preserve space for the bent stacks.

12 Claims, 4 Drawing Sheets

(56) References Cited

U.S. PATENT DOCUMENTS

2015/0145482 A1\* 5/2015 Hurng ................. H01M 2/1022
　　　　　　　　　　　　　　　　　　　　　320/134
2018/0145287 A1　 5/2018 Lange et al.
2018/0219203 A1\* 8/2018 Jones .................. H01M 2/1077

\* cited by examiner

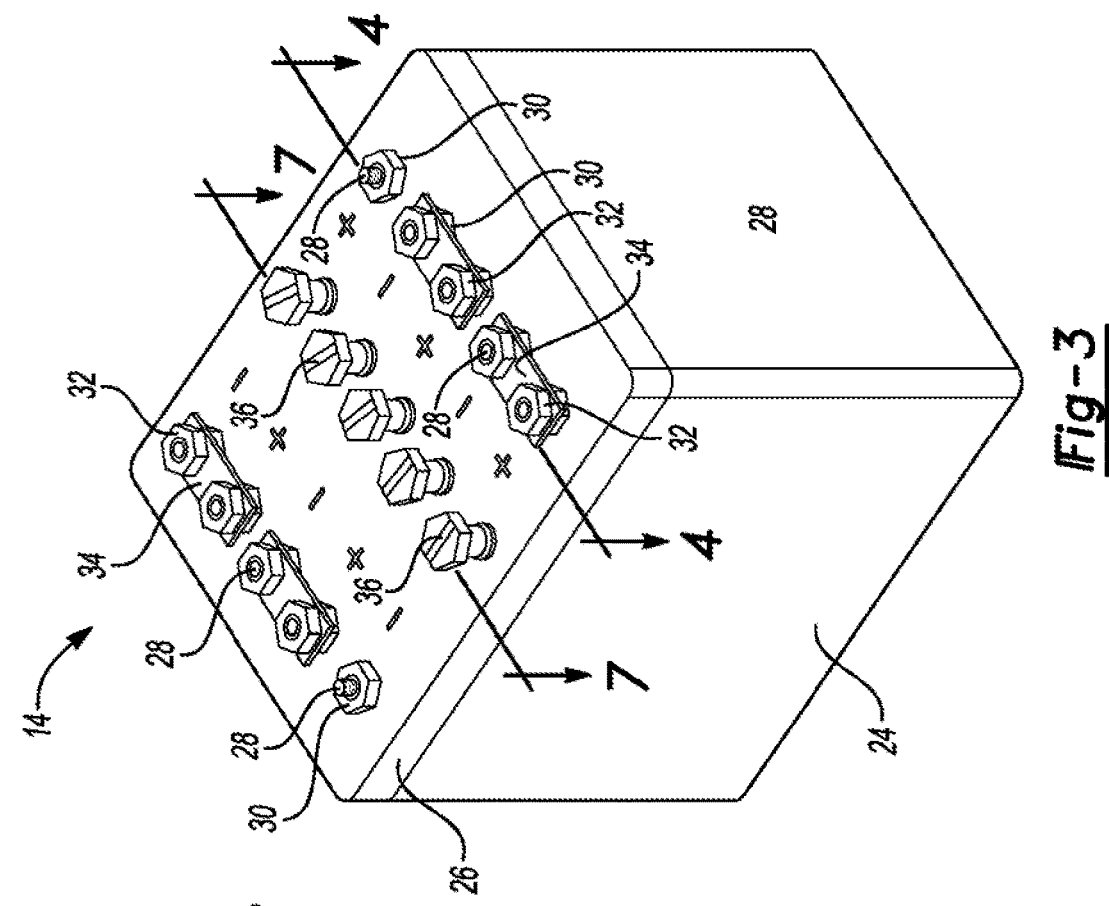
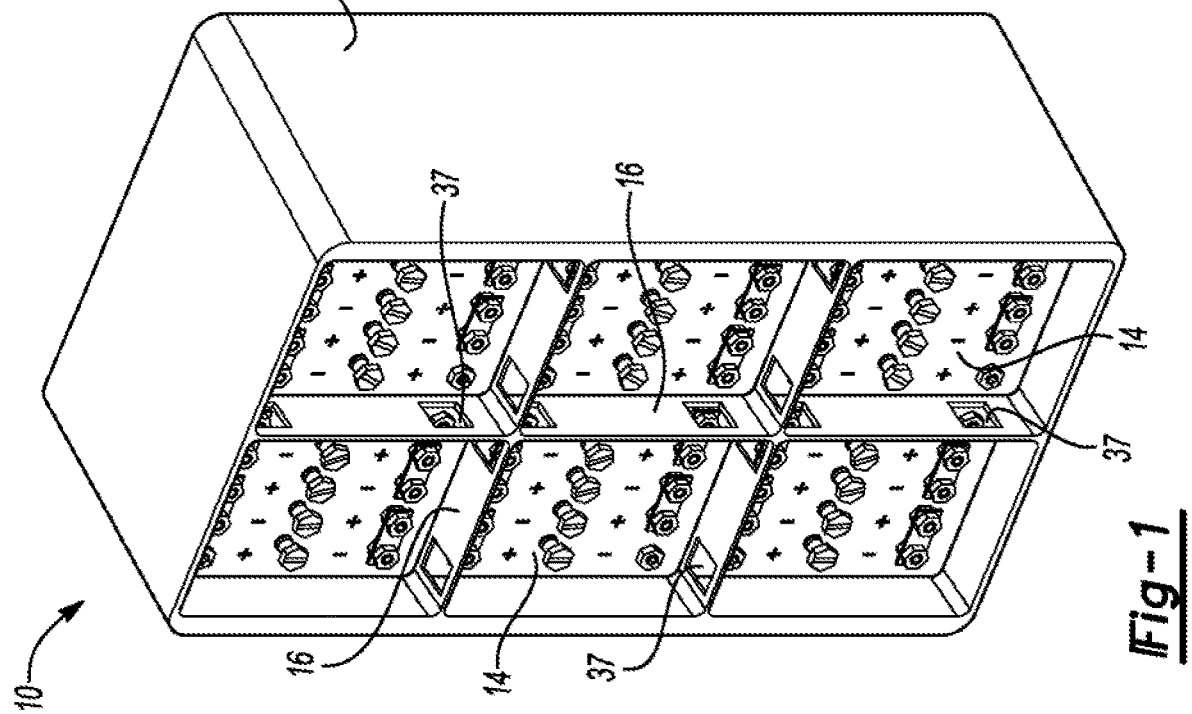

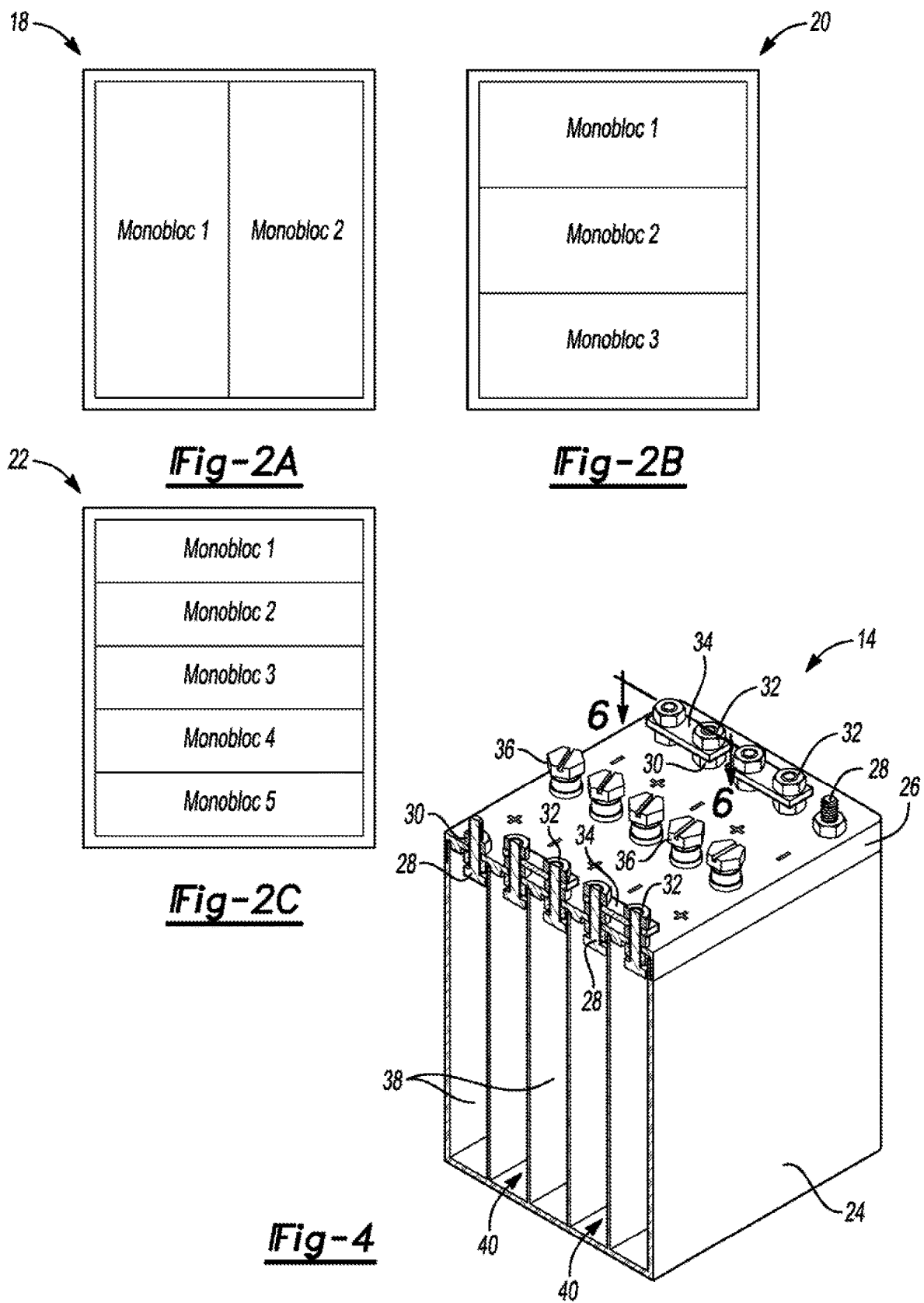

MONOBLOCS AND MONOBLOC BATTERIES

CROSS-REFERENCE TO RELATED APPLICATIONS

This application is a continuation of U.S. application Ser. No. 16/273,755, filed Feb. 12, 2019, the disclosure of which is hereby incorporated in its entirety by reference herein.

TECHNICAL FIELD

The disclosure relates to the construction of monoblocs and monobloc batteries.

BACKGROUND

The common 12V battery used in many applications is typically of the lead-acid type. Despite having low energy-to-weight ratios and low energy-to-volume ratios, lead-acid batteries are often able to supply high surge currents, meaning they have relatively large power-to-weight ratios. Such characteristics, along with being low cost, make them and other lead-acid type batteries suitable for wide-spread use.

Components, including those used for batteries, are often standardized for mass production purposes. Hence the form factors for various lead-acid batteries are common.

SUMMARY

A monobloc includes an outer case and a lid sealed with the outer case. The outer case includes inner parallel walls extending from a base thereof to the lid to define compartments. Adjacent pairs of the walls are separated by a common span. The monobloc also includes terminals secured to and extending away from opposite sides of the lid such that each of the terminals extends into one of the compartments and also away from an exposed surface of the lid. Each of the terminals is positioned adjacent to one of the walls of a corresponding one of the compartments such that the terminal is closer to the one of the walls relative to the other of the walls of the corresponding compartment and not centered within the span between the one and the other of the walls. The monobloc further includes a cell in each of the compartments having electrodes and tabs. The tabs extend toward the lid, define openings, and are folded together to form a bent stack such that the openings are at least partially aligned. One of the terminals extends through the openings to electrically connect the electrodes with the one of the terminals.

BRIEF DESCRIPTION OF THE DRAWINGS

FIG. 1 is a perspective view of a monobloc battery.

FIGS. 2A, 2B, and 2C are schematic plan views of other monobloc batteries.

FIG. 3 is a perspective view of a monobloc of the monobloc battery of FIG. 1

FIG. 4 is a perspective view, in cross-section, of the monobloc of FIG. 3.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Monobloc batteries may have multiple separate but electrically connected cell compartments each of which houses an assembly of electrodes, electrolyte, terminals or interconnections, and possible separators. These assemblies, or cells, can be connected in series or in parallel. Contemplated herein are monobloc battery configurations having various form factors.

Referring to FIG. 1, an example monobloc battery 10 includes a housing 12 and monoblocs 14. The housing 12 defines a series of dividers 16 that separate the monoblocs 14 from one another and reinforce the overall rigidity of the housing 12. The dividers 16 extend from a bottom of the housing toward a top thereof. In this example, they contact a corresponding lid (not shown) and create six cavities that each contain one of the monoblocs 14.

Figure 5:
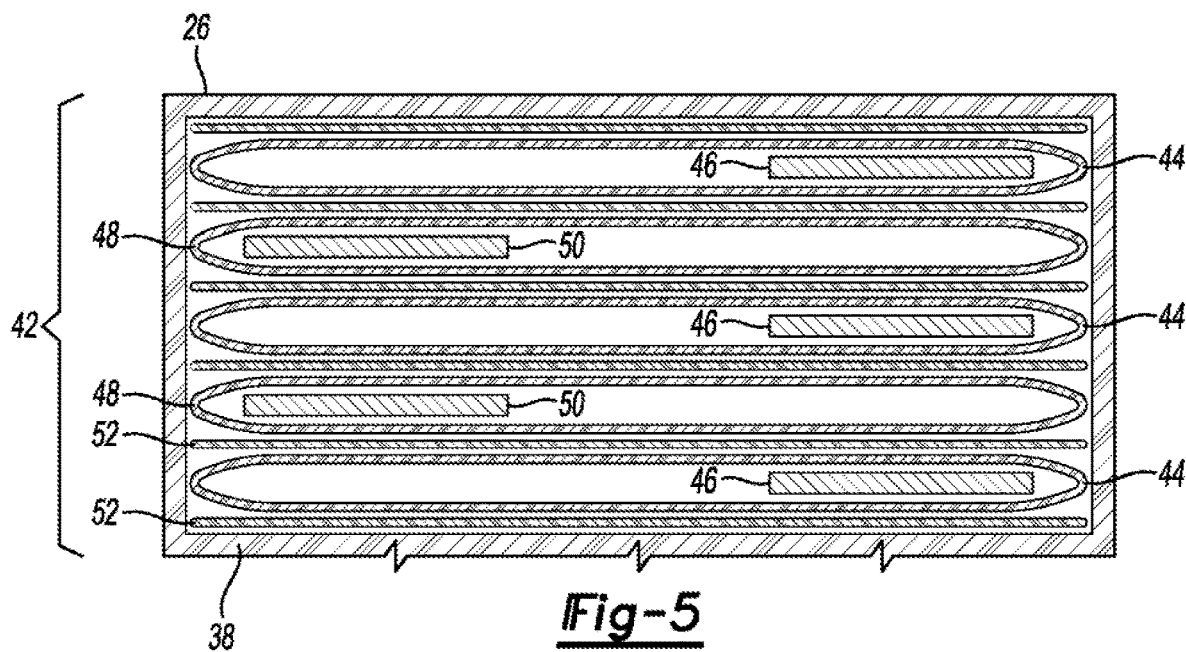
FIG. 5 is schematic plan view, in cross-section, of a single cell of the monobloc of FIG. 3.

Each of the monoblocs 14 is an 8V sub-battery including five 1.6 V cells (see FIG. 5). That is, the monobloc battery 10 is a 48V monobloc battery (six, 8V monoblocs in series). Monoblocs in other configurations, however, may be arranged in different number and in series or parallel for different voltage output (e.g., 3, 8V monoblocs in series, etc.)

Referring to FIGS. 2A, 2B, and 2C, monobloc batteries 18, 20, 22 may have two, three, five, or other number of cavities, with or without dividers. Thus, depending on the number of monoblocs, the voltage of the monoblocs, and whether the monoblocs are connected in series or parallel, a variety of voltages are possible within various form factors.

Referring to FIGS. 1 and 3, each of the monoblocs 14 in this example includes a case 24, a lid 26, terminals 28, lower nuts 30, upper nuts 32, bus bars 34, and valves 36. Some of the terminals 28 may be interconnected in series or parallel between the monoblocs 14 through openings 37 in the dividers 16. These and other components will be discussed in thriller detail below.

Referring to FIGS. 4 and 5, the monobloc 14 of FIG. 3 has been sectioned along the cut line 4-4 of FIG. 3. The case 24 includes a series of parallel walls 38 extending from a bottom thereof to the lid 26. The walls 38 define sealed (e.g., adhesively, ultrasonically, etc.) compartments 40 that each contain a cell 42. The walls 38 are generally equally spaced apart so that a distance or span between adjacent pairs of the walls 38 is generally the same. (To improve clarity, FIG. 4 does not show the cells 42 within the sealed compartments 40.) Each of the sealed compartments 40 is serviced by a pair of the terminals 28 and one of the valves 36. Rather than being centered between an adjacent pair of the walls 38 (or one of the walls 38 and case 24 for those compartments 40 partially defined by the case 24), the terminals 28 are off-centered to provide additional packaging space for tabs 46, 50 of the cells 42 as discussed more below. In certain applications, each of the sealed compartments 40 may include a recombination coil (not shown) attached with positive ones of the terminals 28 to transform hydrogen and oxygen to water.

Each of the cells 42 includes a set of negative electrodes 44 with corresponding tabs 46, a set of positive electrodes 48 with corresponding tabs 50, and separator systems 52. The negative electrodes 44 and positive electrodes 48 alternate and have one of the separator systems 52 disposed therebetween to form a stack. For purposes of illustration, FIG. 5 shows three negative electrodes 44 and two positive electrodes 48. Actual arrangements, however, may include seven negative electrodes and six positive electrodes, four negative electrodes and three positive electrodes, etc. The tabs 46, 50 extend away from a top of the cell 42 toward the lid 26. The tabs 46 are collected together and mechanically attached with one of the terminals 28. Likewise, the tabs 50 are collected together and mechanically attached with one of the terminals 28.

Figure 6:
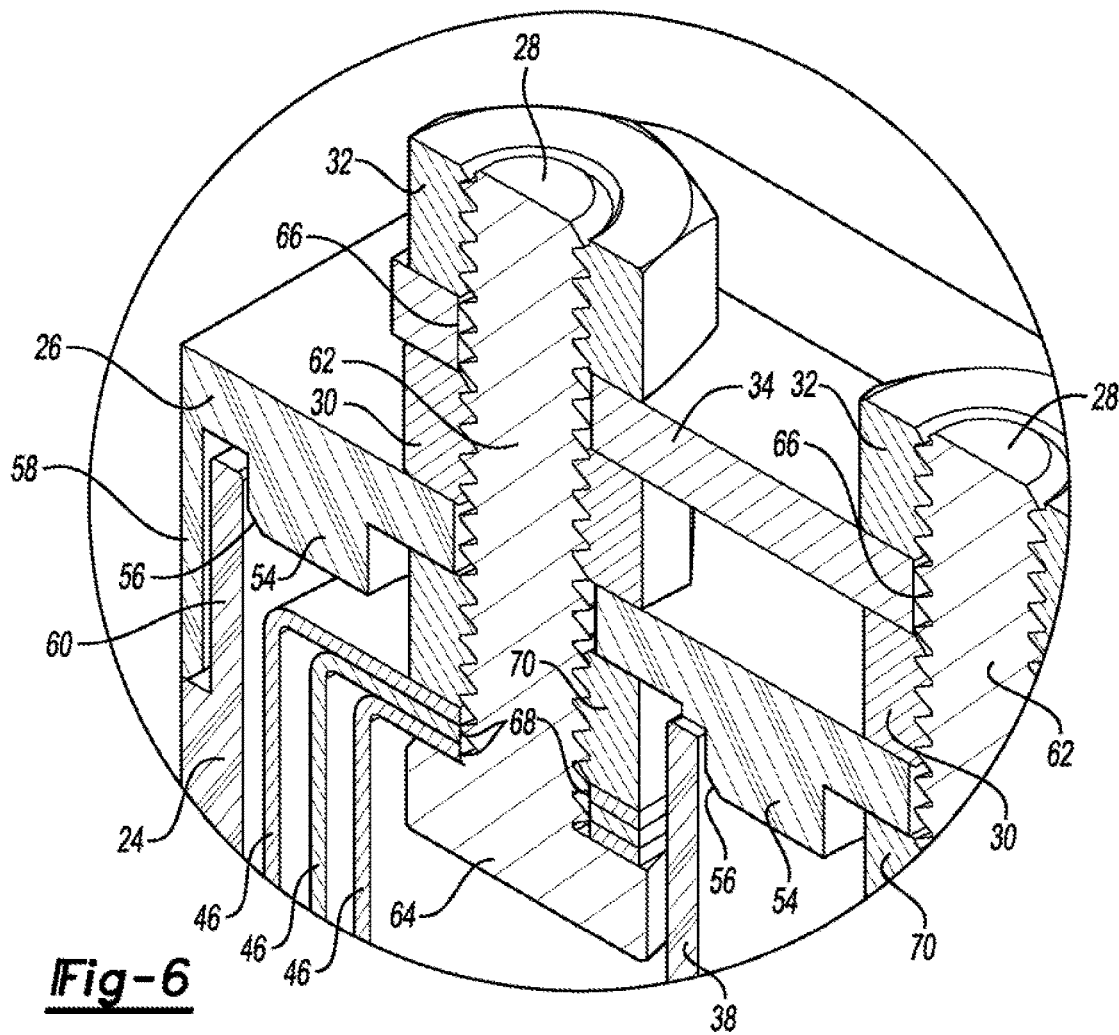
FIG. 6 is an enlarged perspective view, in cross-section, of a portion of the monobloc of FIG. 4.

Referring to FIG. 6, the lid 26 defines a set of locating features 54 extending from a surface thereof toward an interior of the monobloc 14. Each of the locating features is configured to contact a corresponding one of the walls 38 (or the case 24) to assist in properly positioning the lid 26 relative to the case 24 during assembly. To this end, each of the locating features 54 includes a beveled edge 56 that may initially contact a corresponding one of the walls 38 (or case 24) and guide the lid 26 into position. Additionally, an outer perimeter of the lid 26 is thinned to provide a lid leg 58 that extends toward a bottom of the case 24, and a top portion of the case 24 is thinned to provide a case leg 60. The lid leg 58 and case leg 60 interface with each other to form a lap joint around the monobloc 14. An epoxy or other bonding agent can be used to fill the gaps therebetween. Other joints, however, are also contemplated.

Each of the terminals 28 includes a threaded portion 62 and a platform 64. The threaded portions 62 extend through and away from the lid 26. With reference to one of the terminals 28, a corresponding pair of the lower and upper nuts 30, 32 engage the threaded portion 62 to secure the bus bar 34, which provides a bore 66 to accommodate the threaded portion 62, therebetween outside the monobloc 14.

With continuing reference to one of the terminals 28, the platform 64 is located inside the monobloc 14. As suggested above, the anode tabs 46 adjacent one another are collected together and mechanically attached with the terminal 28. To execute such attachment, the anode tabs 44 each define an opening 68 near an end thereof. The anode tabs 44 of interest are collected together to form a loose stack and bent (in some instances to form an L-shape) such that the openings 68 generally align.

During initial assembly, one of the cells 42 is inserted into one of the sealed compartments 40 such that the anode tabs 46 and cathode tabs 50 extend toward the space to be occupied by the lid 26. Adjacent ones of the anode tabs 46 are clamped together to touch one another and to align the openings 68. The threaded portion 62 of the terminal 28 is then inserted through the openings 68, and the anode tabs 46 are bent as illustrated in FIG. 6 to form a loose L-shaped stack as mentioned above. A similar process is used to attach the cathode tabs 50. An additional nut 70 is engaged with the threaded portion 62 to secure the tabs 44 against the platform 64. The additional nut 70, as well as some of the nuts 30, 32, may be tack welded or epoxied in place. Because the terminal 28 and tabs 44 are electrically conductive, this arrangement defines an electrical pathway for current from the cell 42.

As mentioned earlier, the terminals 28 are off-centered. That is, the terminals 28 are positioned closer to one of the walls 38 of a corresponding one of the compartments 40 as compared with the other of the walls 38 of the corresponding one of the compartments 40. In the example illustrated, the terminals 28 are positioned as close to the one of the walls 38 as the platform 64 and additional nuts 70 allow. If they were instead centered between an adjacent pair of the walls 38 (or one of the walls 38 and case 24), it may be difficult if not impossible to collect the anode tabs 46 together as described and attach them with the terminal 28. The top center regions of the compartments 40 thus provide valuable space for the anode tabs 46 and cathode tabs 50 to occupy when bent.

Figure 7:
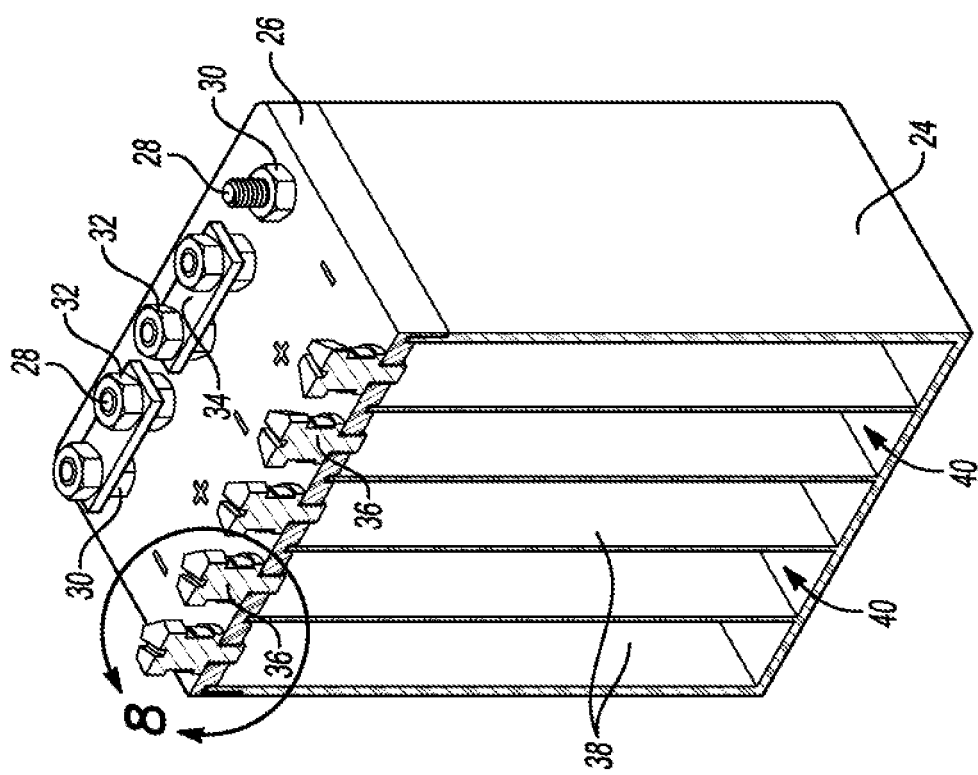
FIG. 7 is another perspective view, in cross-section, of the monobloc of FIG. 3.

Referring to FIG. 7, the monobloc cell 14 of FIG. 3 has been sectioned along the cut line 7-7 of FIG. 3. Each of the compartments 40 is serviced by one of the valves 36 as mentioned above to provide a vent therefor.

Figure 8:
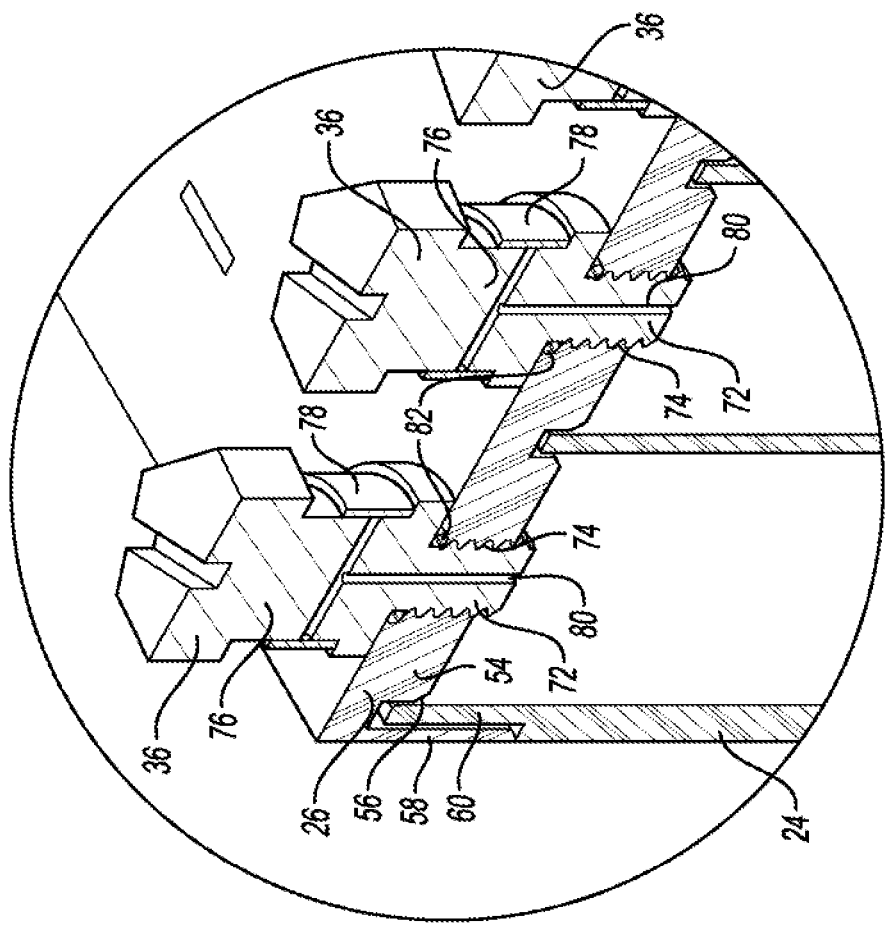
FIG. 8 is an enlarged perspective view, in cross-section, of a portion of the monobloc of FIG. 7.

Referring to FIG. 8, the valves 36, in this example, each include a threaded portion 72 that engages a corresponding threaded portion 74 of the lid 26. With reference to a particular one of the valves 36, the valve 36 further includes a head portion 76, an expansion seal 78 thereon, and a fluid passageway 80 extending through the threaded portion 74 and head portion 76, and terminating at the burst seal 78. An O-ring 82 can be used to further complete the seal between the valve 36 and lid 26. If sufficient pressure builds within the corresponding compartment 40, expansion seal 78 will expand allowing fluid from within the corresponding compartment 40 to exit via the fluid passageway 80. Any type of valve, however, may be used.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A monobloc comprising:
an outer case;
a lid sealed with the outer case, the outer case including inner parallel walls extending from a base thereof to the lid to define compartments, and adjacent pairs of the walls being separated by a common span;

terminals secured to and extending away from opposite sides of the lid such that each of the terminals extends into one of the compartments and also away from an exposed surface of the lid, each of the terminals being positioned adjacent to one of the walls of a corresponding one of the compartments such that the terminal is closer to the one of the walls relative to the other of the walls of the corresponding compartment and not centered within the span between the one and the other of the walls; and a cell in each of the compartments including electrodes and tabs, the tabs extending toward the lid, the tabs defining openings that pass through the tabs, the tabs being folded together to form a bent stack such that the openings are at least partially aligned, and one of the terminals extending through the openings to electrically connect the electrodes with the one of the terminals.

2. The monobloc of claim 1, wherein each of the terminals defines a platform in contact with a corresponding one of the tabs.

3. The monobloc of claim 1 further comprising mechanical fasteners securing the terminals to the lid.

4. The monobloc of claim 3, wherein the tabs are clamped between platforms defined by the terminals and some of the mechanical fasteners.

5. The monobloc of claim 1 further comprising bus bars outside the outer case and lid interconnecting the terminals.

6. The monobloc of claim 5 further comprising mechanical fasteners securing the bus bars to the terminals and spacing the bus bars away from the exposed surface of the lid.

7. The monobloc of claim 1 further comprising valves secured to the lid and in fluid communication with the compartments.

8. The monobloc of claim 1, wherein the cells include negative electrodes and positive electrodes.

9. The monobloc of claim 1, wherein each of the terminals is a threaded fastener.

10. A monobloc battery comprising:

a housing; and a plurality of the monoblocs of claim 1 electrically connected together and contained within the housing.

11. The monobloc battery of claim 10, wherein the housing defines openings for electrical connections between the monoblocs.

12. The monobloc battery of claim 10, wherein a collective voltage output of the plurality is 12V, 24V, or 48V.

* * * * *